United States Patent
Uchikawa

(10) Patent No.: US 10,853,012 B2
(45) Date of Patent: Dec. 1, 2020

(54) IMAGE FORMING APPARATUS PERFORMING WIRELESS LAN COMMUNICATION THROUGH ACCESS POINT, CONTROL METHOD THEREFOR, AND STORAGE MEDIUM STORING CONTROL PROGRAM THEREFOR

(71) Applicant: CANON KABUSHIKI KAISHA, Tokyo (JP)

(72) Inventor: Shinichi Uchikawa, Matsudo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/043,719

(22) Filed: Jul. 24, 2018

(65) Prior Publication Data

US 2019/0034142 A1    Jan. 31, 2019

(30) Foreign Application Priority Data

Jul. 25, 2017  (JP) .................................. 2017-143588

(51) Int. Cl.
*G06F 3/12* (2006.01)
*H04N 1/00* (2006.01)
(Continued)

(52) U.S. Cl.
CPC .......... *G06F 3/1286* (2013.01); *G06F 3/1204* (2013.01); *G06F 3/1236* (2013.01); *H04N 1/0035* (2013.01); *H04N 1/00095* (2013.01); *H04N 1/00103* (2013.01); *H04N 1/00127* (2013.01); *H04W 4/00* (2013.01); *H04W 4/02* (2013.01); *H04N 2201/0094* (2013.01)

(58) Field of Classification Search
CPC ..... G06F 3/1286; G06F 3/1204; G06F 3/1236
See application file for complete search history.

(56) References Cited

U.S. PATENT DOCUMENTS

| 2006/0105714 A1* | 5/2006 | Hall ...................... H04W 12/08 455/41.3 |
| 2006/0206592 A1* | 9/2006 | Fujii ..................... H04W 48/16 709/220 |

(Continued)

FOREIGN PATENT DOCUMENTS

| CN | 205405745 U | 7/2016 |
| JP | 2003319461 A | 11/2003 |

OTHER PUBLICATIONS

Office Action issued in Chinese Appln. No. 201810818792.1 dated Jun. 3, 2020. English translation provided.

*Primary Examiner* — Moustapha Diaby
(74) *Attorney, Agent, or Firm* — Rossi, Kimms & McDowell LLP

(57) ABSTRACT

An image forming apparatus that is capable of communicatively connecting to a suitable access point corresponding to a role of a wireless LAN. The image forming apparatus communicates by the wireless LAN through an access point. A role setting unit makes a user set a role of the wireless LAN in the image forming apparatus. A control unit controls a setting of the access point corresponding to the role of the wireless LAN. The control unit makes the user reset the access point in a case where the role of the wireless LAN has been changed. The role of the wireless LAN shows whether the wireless LAN is used as a main line or a subline.

17 Claims, 10 Drawing Sheets

(51) Int. Cl.
*H04W 4/00* (2018.01)
*H04W 4/02* (2018.01)

(56) References Cited

U.S. PATENT DOCUMENTS

| | | | |
|---|---|---|---|
| 2009/0017861 A1* | 1/2009 | Wu ..................... | H04W 52/325 455/522 |
| 2009/0092106 A1* | 4/2009 | Nakayama ......... | H04N 1/00214 370/338 |
| 2010/0281360 A1* | 11/2010 | Arakane ............... | G06F 3/0482 715/244 |
| 2010/0303040 A1* | 12/2010 | Takamune ............ | H04W 48/16 370/331 |
| 2012/0196639 A1* | 8/2012 | Takeda ................. | H04W 48/16 455/515 |
| 2014/0085655 A1* | 3/2014 | Matsubara ......... | H04N 1/00952 358/1.13 |
| 2014/0269507 A1* | 9/2014 | Tanji .................... | H04W 76/23 370/328 |
| 2015/0146703 A1* | 5/2015 | Son ....................... | H04W 48/16 370/338 |
| 2015/0189023 A1 | 7/2015 | Kubota | |
| 2016/0095146 A1* | 3/2016 | Ren ....................... | H04W 76/14 370/329 |
| 2016/0291851 A1* | 10/2016 | Tomono ............. | H04N 1/00411 |
| 2017/0123736 A1 | 5/2017 | Park | |

\* cited by examiner

IMAGE FORMING APPARATUS PERFORMING WIRELESS LAN COMMUNICATION THROUGH ACCESS POINT, CONTROL METHOD THEREFOR, AND STORAGE MEDIUM STORING CONTROL PROGRAM THEREFOR

BACKGROUND OF THE INVENTION

Field of the Invention

The present invention relates to an image forming apparatus, a control method therefor, and a storage medium storing control program therefor.

Description of the Related Art

There is a known MFP as an image forming apparatus that performs wireless LAN communication. When performing wireless LAN communication, an MFP retrieves access points to which the MFP is communicatively connectable, and makes a user set up a desired access point from among the retrieved selection candidates. After the success of communication connection to the set access point, the MFP manages a history of connection to the access point (a connection history). For example, the MFP communicatively connects to the access point on the basis of the connection history at start-up of the MFP. Thereby, the MFP communicatively connects to the access point that succeeded in communication connection in the past easily without making a user set up the access point repeatedly.

Moreover, an MFP that performs wired LAN communication other than the wireless LAN communication is also developed. This MFP is provided with both of a communication interface for performing the wired LAN communication and a communication interface for performing the wireless LAN communication (for example, see Japanese Laid-Open Patent Publication (Kokai) No. 2003-319461 (JP 2003-319461A)). For the MFP equipped with a plurality of communication interfaces, addition of a communication function with multiple lines that are available by classifying networks in accordance with the use other than the above-mentioned single-line communication function that merely uses a main line is examined. In the multiple-line communication, a wired LAN is used as a main line and a wireless LAN that is a different network from the wired LAN is used as a subline, for example. In this MFP, when a user switches between the single-line communication function and the multiple-line communication function, a role of the wireless LAN may be changed. For example, the role of the wireless LAN used as the main line in the single-line communication function is changed into the sublime in the multiple-line communication function. At this time, the MFP needs to switch the access point to which the MFP communicatively connects from the access point connecting to the network of the main line to the access point connecting to the network of the subline.

However, when the role of the wireless LAN is changed, a conventional MFP automatically connects to the access point that succeeded in communication connection in the past and cannot communicatively connect to an access point corresponding to the role of the wireless LAN.

SUMMARY OF THE INVENTION

The present invention provides an image forming apparatus, a control method therefor, and a storage medium storing a control program therefor, which are capable of communicatively connecting to a suitable access point corresponding to a role of a wireless LAN.

Accordingly, a first aspect of the present invention provides an image forming apparatus communicating by a wireless LAN through an access point, comprising a role setting unit configured to make a user set a role of the wireless LAN in the image forming apparatus, and a control unit configured to control a setting of the access point corresponding to the role of the wireless LAN. The control unit makes the user reset the access point in a case where the role of the wireless LAN has been changed. The role of the wireless LAN shows whether the wireless LAN is used as a main line or a subline.

Accordingly, a second aspect of the present invention provides a control method for an image forming apparatus communicating by a wireless LAN through an access point, comprising a role setting step of making a user set a role of the wireless LAN in the image forming apparatus, and a control step of controlling a setting of the access point corresponding to the role of the wireless LAN. The user is prompted to reset the access point in the control step in a case where the role of the wireless LAN has been changed. The role of the wireless LAN shows whether the wireless LAN is used as a main line or a subline.

Accordingly, a third aspect of the present invention provides a non-transitory computer-readable storage medium storing a control program causing a computer to execute the control method of the second aspect.

According to the present invention, the image forming apparatus communicatively connects to the suitable access point corresponding to the role of the wireless LAN.

Further features of the present invention will become apparent from the following description of exemplary embodiments with reference to the attached drawings.

DESCRIPTION OF THE EMBODIMENTS

Hereafter, embodiments according to the present invention will be described in detail with reference to the drawings.

Figure 1:
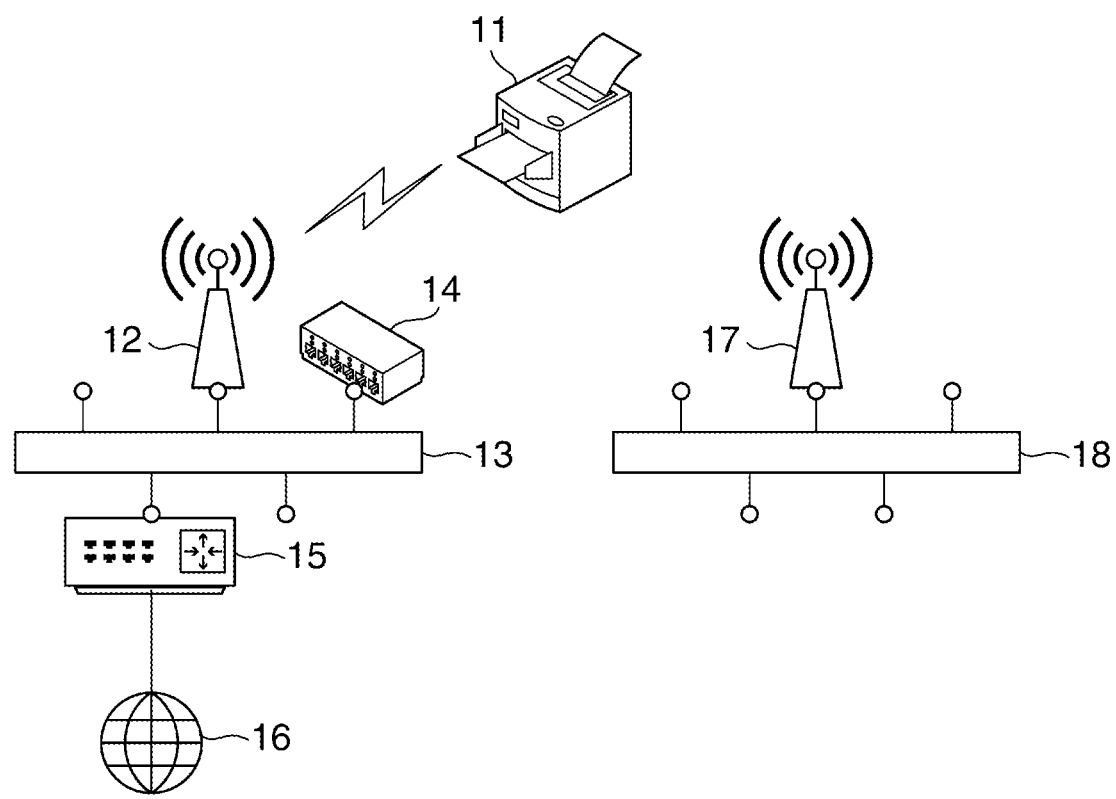
FIG. 1 is a network diagram for describing communication by an MFP that is an image forming apparatus according to an embodiment of the present invention.

FIG. 1 is a network diagram for describing communication by an MFP 11 that is an image forming apparatus according to an embodiment of the present invention.

As shown in FIG. 1, the MFP 11 constitutes a wireless LAN by joining to a network 13 through an access point 12. The MFP 11 registers connection destination information, such as an SSID of the access point 12, into a connection history (a history of connection to an access point) for managing an access point that succeeded in the communication connection. The connection history is stored in an HDD 205 mentioned later. In the embodiment, the MFP 11 obtains the SSID of the access point 12 from the above-mentioned connection history at start-up and sets the obtained SSID automatically. This enables the MFP 11 to reconnect to the access point 12 easily without requiring a user to set a communication connection to the access point 12 repeatedly. Moreover, the MFP 11 constitutes a wired LAN by joining to the network 13 through a HUB 14 connected via a LAN cable (not shown). The network 13 is used as a main line of the MFP 11. The network 13 is connected to the Internet 16 through a gateway 15. A communication apparatus that can use the Internet 16 can join to the network 13. Accordingly, the MFP 11 is able to communicate with many apparatuses including a communication apparatus that can use the Internet 16 through the network 13 as the main line. A user is able to set either the wireless LAN or the wired LAN as the main line used by the MFP 11.

Moreover, the MFP 11 is further provided with a subline that enables communication concurrently with the main line. The subline is restricted in functions as compared with the main line in order to enable communication concurrently with the main line. The MFP 11 uses one of the wired LAN and wireless LAN as the main line and uses the other as the subline. For example, when using the wired LAN as the main line and using the wireless LAN as the subline, the MFP 11 constitutes the wireless LAN as the subline by joining the network 18 through the access point 17. At this time, the MFP 11 registers the connection destination information, such as the SSID of the access point 17, into the above-mentioned connection history. The network 18 is not connected to the Internet 16 and consists of only specific communication apparatuses. Namely, an access point that becomes a communication connection destination is changed depending on the role of the wireless LAN that is the main line or the subline in the embodiment.

Figure 2:
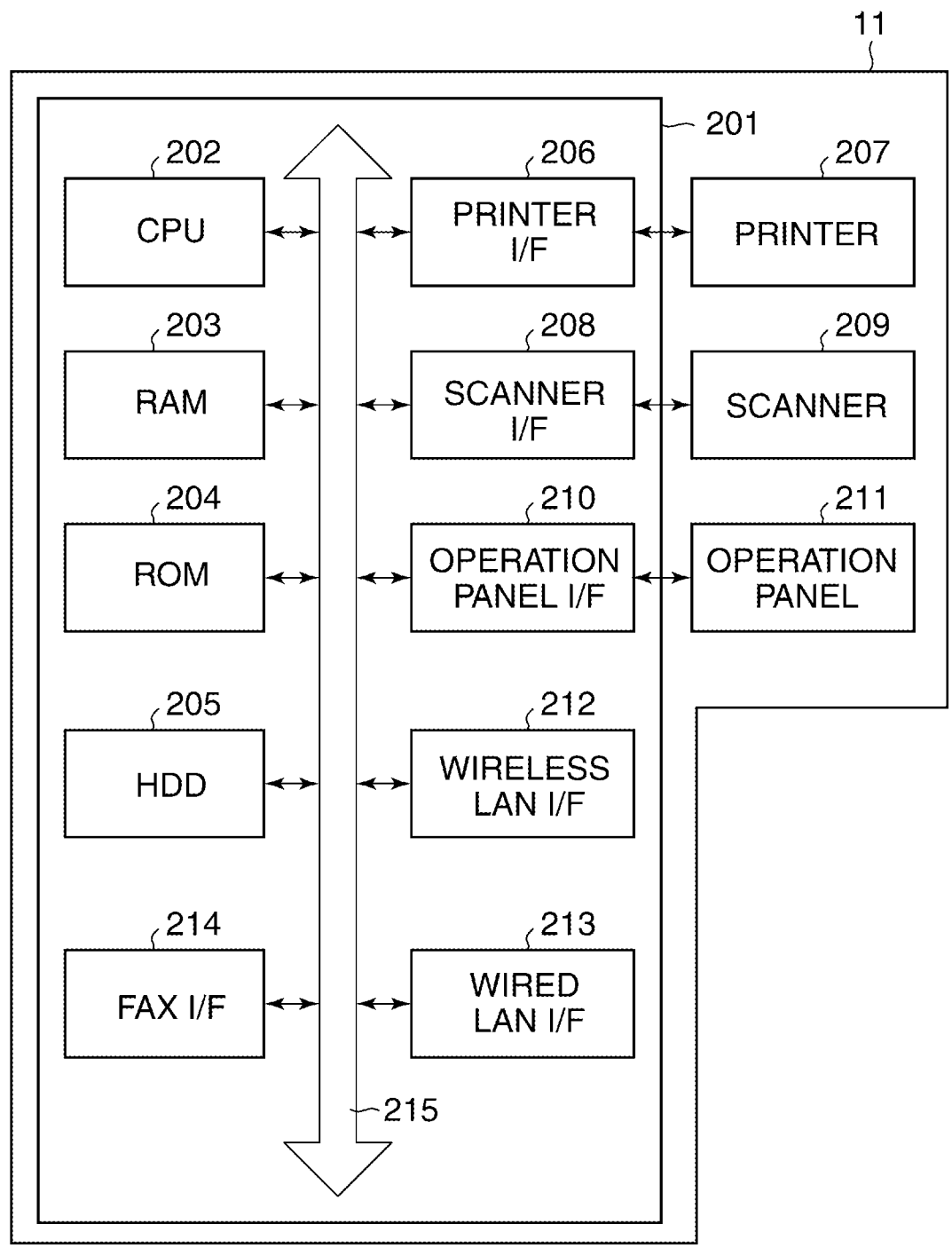
FIG. 2 is a block diagram schematically showing a hardware configuration of the MFP in FIG. 1.

FIG. 2 is a block diagram schematically showing a hardware configuration of the MFP 11 shown in FIG. 1.

As shown in FIG. 2, the MFP 11 is provided with a controller 201, a printer 207, a scanner 209, and an operation panel 211. The controller 201 is connected to the printing unit 207, the scanner 209, and the operation panel 211. The controller 201 is provided with a CPU 202, a RAM 203, a ROM 204, an HDD 205, a printer I/F 206, a scanner I/F 208, an operation panels I/F 210, a wireless LAN I/F 212, a wired LAN I/F 213, and a FAX I/F 214. The CPU 202, RAM 203, ROM 204, HDD 205, printer I/F 206, scanner I/F 208, operation panels I/F 210, wireless LAN I/F 212, wired LAN I/F 213, and FAX I/F are mutually connected through a bus 215.

The controller 201 totally controls the entire MFP 11. The CPU 202 reads a program for controlling each section of the MFP 11 from the ROM 204, develops it to the RAM 203, and runs the read program. The RAM 203 is used as a main memory of the CPU 202 and is used as a temporary storage area for data. Although the embodiment describes the configuration where the controller 201 is provided with the single CPU 202 and the single RAM 203 as an example, each of the numbers of the CPU 202 and RAM 203 in the controller 201 is not limited to one. For example, the controller 201 may be provided with a plurality of CPUs 202 and a plurality of RAMS 203. In such a case, the plurality of CPUs 202 and the plurality of ROMs 204 may cooperate to control each section. The ROM 204 stores programs that are executed by the CPU 202 and set values etc. The HDD 205 stores programs and data used for controlling each section.

Figure 3:
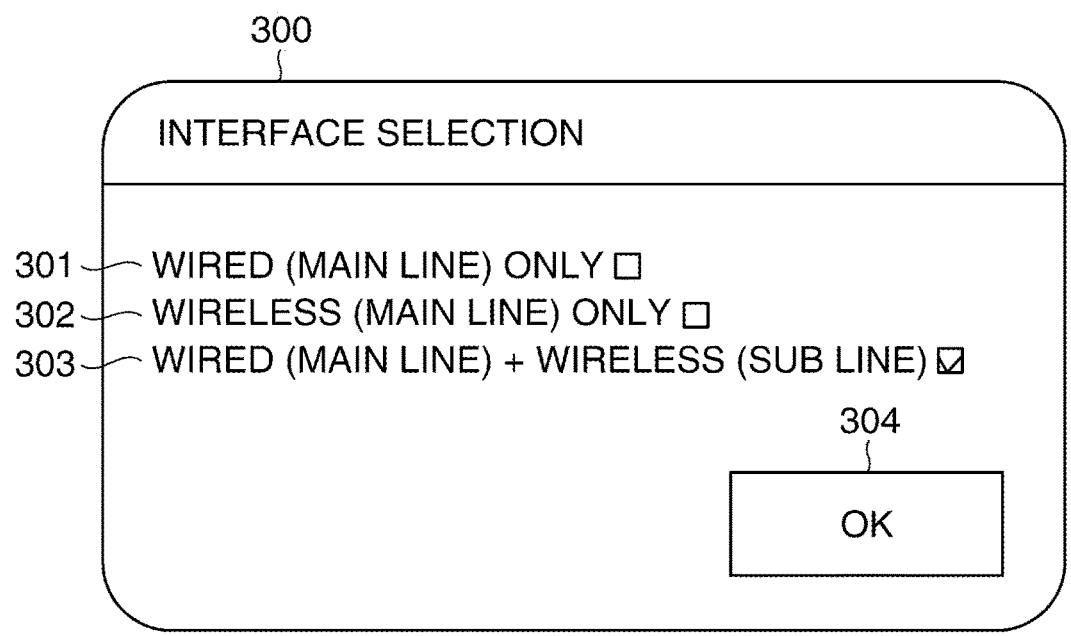
FIG. 3 is a view showing an example of an interface selection screen displayed on an operation panel in FIG. 2.

The printer I/F 206 connects the printing unit 207 to the controller 201. The printer 207 prints print data input through the printer I/F 206 on a sheet. The scanner I/F 208 connects the scanner 209 to the controller 201. The scanner 209 reads a stacked original and generates image data on the basis of the read image information. The image data that the scanner 209 generated is printed by the printer 207 or is stored in the HDD 205. Moreover, the above-mentioned image data is sent to communication apparatuses through the FAX I/F 214, the wireless LAN I/F 212, and the wired LAN I/F 213. The operation panel I/F 210 connects the operation panel 211 to the controller 201. The operation panel 211 is provided with a touch-sensitive display unit. The operation panel 211 displays a setting screen for setting each value of the MFP 11 and receives an instruction input by a user. In the embodiment, an interface selection screen 300 shown in FIG. 3 is displayed on the operation panel 211, for example (a role setting unit).

The interface selection screen 300 is a setting screen for infrastructure settings of the MFP 11. When "WIRED (MAIN LINE) ONLY" 301 is set to ON, the MFP 11 uses the wired LAN as the main line. When "WIRELESS (MAIN LINE) ONLY" 302 is set to ON, the MFP 11 uses the wireless LAN as the main line and performs wireless LAN communication through the access point 12. When "WIRED (MAIN LINE)+WIRELESS (SUB LINE)" 303 is set to ON, the MFP 11 uses the wired LAN as the main line. Moreover, the MFP 11 uses the wireless LAN as the sub line and performs wireless LAN communication through the access point 17. On the interface selection screen 300, only one of three candidates "WIRED (MAIN LINE) ONLY" 301, "WIRELESS (MAIN LINE) ONLY" 302, and "WIRED (MAIN LINE)+WIRELESS (SUB LINE)" 303 is set to ON. Selection of an OK button 304 stores the set values on the interface selection screen 300 into the HDD 205 etc.

The wireless LAN I/F 212 performs wireless LAN communication through one of the access points 12 and 17 selected according to the values set on the interface selection screen 300. The wired LAN I/F 213 performs wired LAN communication through a LAN cable (not shown) that connects the MFP 11 and the HUB 14. The FAX I/F 214 performs facsimile communication with an external apparatus through a telephone network (not shown).

Figure 4:
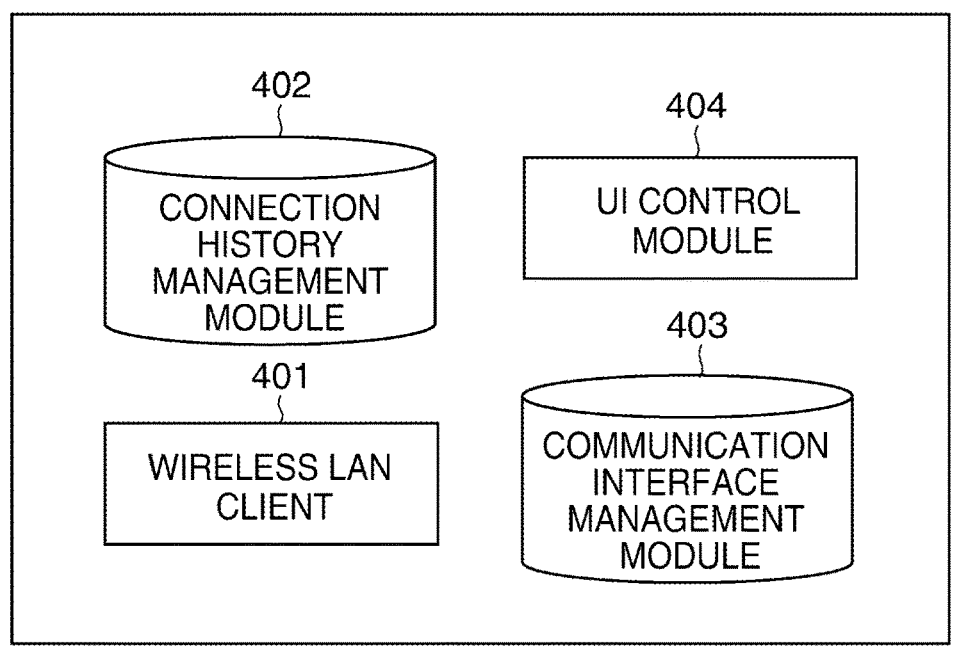
FIG. 4 is a block diagram schematically showing a software configuration of the MFP in FIG. 1.

FIG. 4 is a block diagram schematically showing a software configuration of the MFP 11 in FIG. 1.

As shown in FIG. 4, the MFP 11 is provided with a wireless LAN client module 401, a connection-history management module 402, a communication-interface management module 403, and an UI control module 404. The above-mentioned modules are achieved when the CPU 202 executes programs stored in the ROM 204.

The wireless LAN client module 401 provides a wireless LAN client function and connects to the access points 12 and 17. The connection-history management module 402 manages the above-mentioned connection history. The communication-interface management module 403 manages settings of the communication interfaces, such as the wireless LAN I/F 212 and wired LAN I/F 213. For example, the communication-interface management module 403 manages information showing the role of the wireless LAN in the MFP 11, such as the information about either the main line or the subline that is used by the wireless LAN and the information showing authentication methods available to the wireless LAN of the set role, specifically. The UI control module 404 performs controls of the operation panel, such as display control in the operation panel and reception control of information input on the operation panel.

Figure 5:
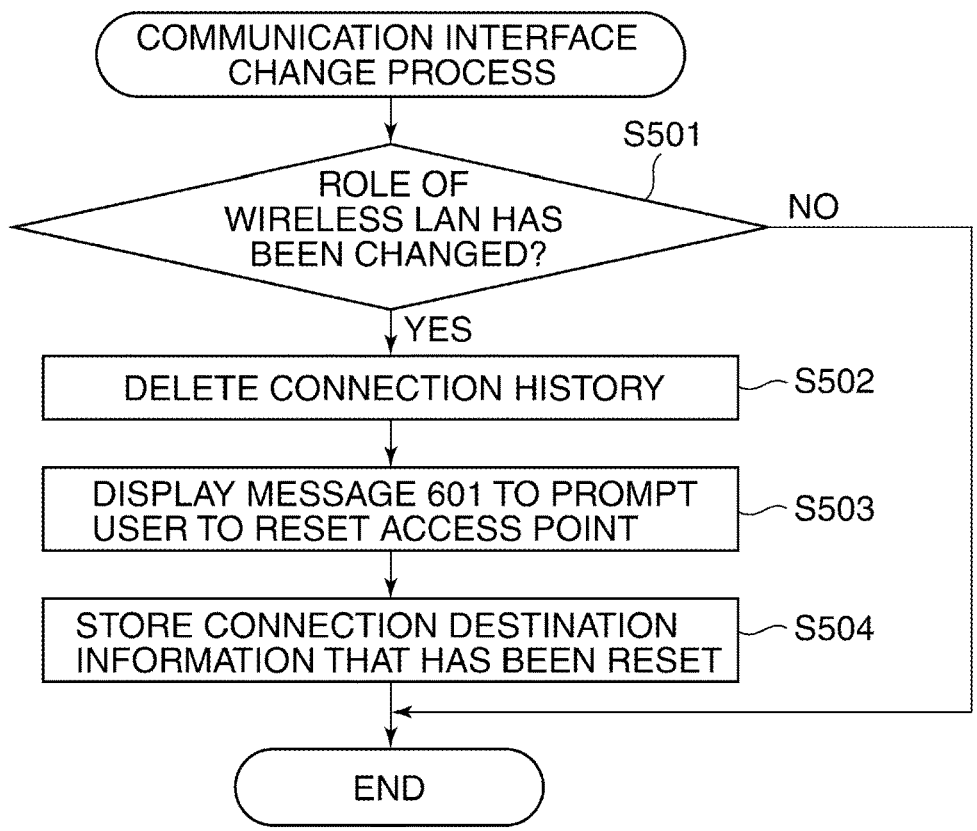
FIG. 5 is a flowchart showing procedures of a communication-interface change process executed by the MFP in FIG. 1.

FIG. 5 is a flowchart showing procedures of a communication-interface change process executed by the MFP 11 in FIG. 1.

The process in FIG. 5 is performed when the CPU 202 runs a program stored in the ROM 204 and when a user operates the interface selection screen 300. The process in FIG. 5 is premised on the fact that the connection destination information that shows either of the access points 12 and 17 is registered in the connection history.

In the MFP 11, when "WIRELESS (MAIN LINE) ONLY" 302 is set to ON and the communication connection to the access point 12 succeeds, the connection destination information showing the access point 12 is registered into the connection history. Then, the communication connection to the access point 12 is once cut, and the role of the wireless LAN in the MFP 11 is changed. Specifically, when the setting of ON is switched from "WIRELESS (MAIN LINE) ONLY" 302 to "WIRED (MAIN LINE)+WIRELESS (SUB-LINE)" 303 on the interface selection screen 300, the MFP 11 sets the access point shown by the connection destination information registered in the connection history in order to perform wireless LAN communication. At this time, the MFP 11 is needed to set the connection destination information about the access point 17 in order to use the wireless LAN as the sub line. A conventional MFP automatically sets the connection destination information showing the access point 12 registered in the connection history. That is, when the role of the wireless LAN is changed, the conventional MFP cannot communicatively connect to an access point corresponding to the changed role.

In light of this problem, when the role of the wireless LAN in the MFP11 is changed, a user is prompted to set an access point again in the embodiment.

As shown in FIG. 5, the CPU 202 first determines whether the role of the wireless LAN has been changed on the interface selection screen 300 (step S501). In the step S501, the CPU 202 determines that the role of the wireless LAN has been changed in a case where an operation that switches the setting from "WIRELESS (MAIN LINE) ONLY" 302 to "WIRED (MAIN LINE)+WIRELESS (SUB LINE)" 303 or an operation that switches the setting from "WIRED (MAIN LINE)+WIRELESS (SUB LINE)" 303 to "WIRELESS (MAIN LINE) ONLY" 302 is performed on the interface selection screen 300. In the meantime, when the above-mentioned operation is not performed, the CPU 202 determines that the role of the wireless LAN has not been changed.

Figure 6:
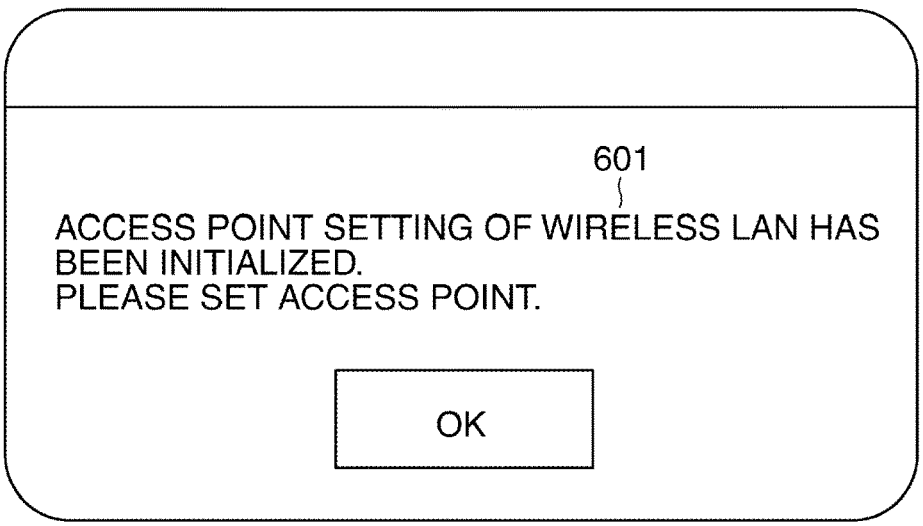
FIG. 6 is a view showing an example of a message displayed on the operation panel in FIG. 2.

As a result of the determination in the step S501, when the role of the wireless LAN has not been changed, the CPU 202 finishes this process. In the meantime, as a result of the determination in the step S501, when the role of the wireless LAN has been changed, the CPU 202 deletes the connection history in which the connection destination information is registered from the HDD 205 (step S502). Next, the CPU 202 displays a message 601 in FIG. 6 that prompts a user to reset an access point on the operation panel 211 (step S503). The user who confirmed the message 601 resets an access point through an operation on an access-point selection screen 800 in FIG. 8 mentioned later, for example. Next, the CPU 202 stores the connection destination information that shows the access point reset by the user into the HDD 205 etc. (step S504) and finishes this process.

The process in FIG. 5 makes a user reset an access point when the role of the wireless LAN is changed. That is, an SSID of an access point that succeeded in the communication connection in the past is not set automatically, but an SSID of a suitable access point corresponding to the changed role of the wireless LAN is set by a user. Accordingly, the MFP 11 communicatively connects to the suitable access point corresponding to the role of the wireless LAN.

Moreover, when the role of the wireless LAN is changed, the history of connection to the access point that succeeded in the communication connection is deleted in the process in FIG. 5. This certainly prevents automatic communication connection to an unsuitable access point that does not correspond to the role of the wireless LAN on the basis of the connection history.

Furthermore, since the message 601 that prompts a user to reset an access point is displayed when the role of the wireless LAN is changed in the above-mentioned process in FIG. 5, the user is notified that reset of an access point is needed.

Figure 7:
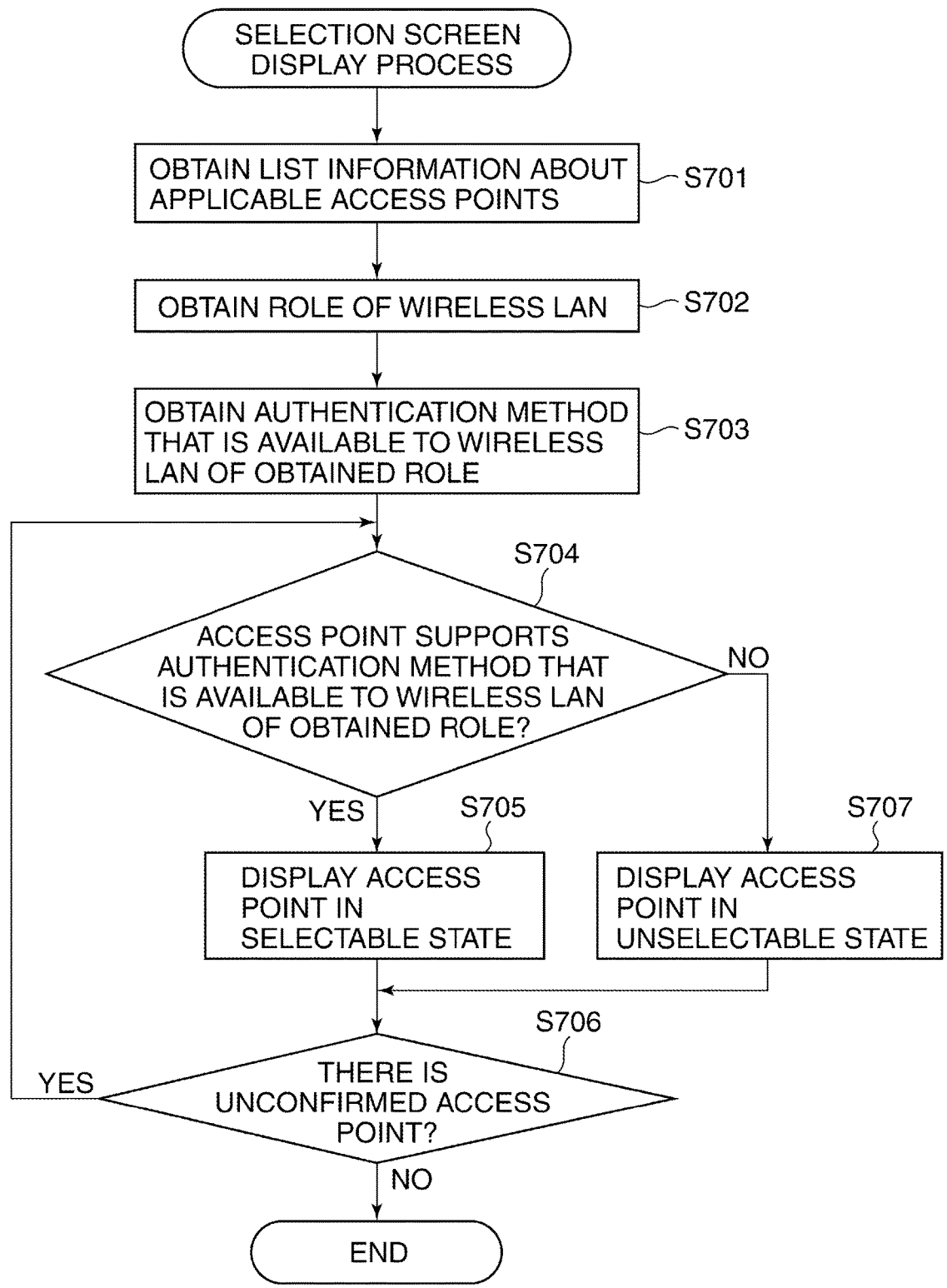
FIG. 7 is a flowchart showing procedures of a selection-screen displaying process executed by the MFP in FIG. 1.

FIG. 7 is a flowchart showing procedures of a selection-screen displaying process executed by the MFP 11 in FIG. 1.

The process in FIG. 7 is also executed when the CPU 202 runs the program stored in the ROM 204. Moreover, the process in FIG. 7 is executed when a user who confirmed the message 601 designates the MFP 11 to display the list information about the access points available to the MFP 11.

In the embodiment, although the main line is not limited in an available function and authentication method, the sub line is limited in an available function and authentication method in order to enable concurrent communication together with the main line. In the meantime, when a user sets access points for a main line and sub line, a conventional MFP executes an access-point retrieval process that retrieves access points that will be selection candidates from among access points that are arranged at positions at which the MFP is communicatively connectable. In the access-point retrieval process, when an access point for either of the main line and sub line is set, access points that support all the authentication methods available to the MFP (i.e., available to the main line) are retrieved. Accordingly, the conventional MFP cites even an access point that is unavailable to the subline, when making a user set an access point for the subline. As a result, for example, even if the process in FIG. 5 prompts a user to reset an access point, the user cannot select a suitable access point corresponding to the role of the wireless LAN from among selection candidates certainly.

In light of this problem, an access point that does not support the authentication method available to the role of the wireless LAN is displayed in the unselectable state on the operation panel 211 in the embodiment.

As shown in FIG. 7, the CPU 202 first retrieves an access point to which the MFP 11 is communicatively connectable and obtains list information about applicable access points (step S701). The above-mentioned list information includes an SSID and radio field intensity of each access point, an authentication method that is supported by each access point, and a radio wave band where each access point was detected. Next, the CPU 202 obtains the role of the wireless LAN of the main line or the sub line (step S702) and obtains the authentication method that is available to the wireless LAN of the obtained role (step S703). For example, the authentication methods of WPA-PSK, WEP, and WPA-EAP shall be available to the wireless LAN of which the role is the main line in this embodiment. In the meantime, the wireless LAN of which the role is the sub line cannot use a function (for example, the IEEE802.1x function) among the functions that are available to the main line and cannot use the authentication method of WPA-EAP relevant to the above-mentioned IEEE802.1x function among the authentication methods of WPA-PSK, WEP, and WPA-EAP.

Next, the CPU 202 determines whether each access point included in the list information obtained in the step S701 supports an authentication method that is available to the wireless LAN of the obtained role (step S704). For example, when the obtained role is the sub line, the CPU 202 determines whether each access point included in the list information supports the authentication methods of WPA-PSK and WEP that are available to the wireless LAN of the sub line in the step S704.

Figure 8:
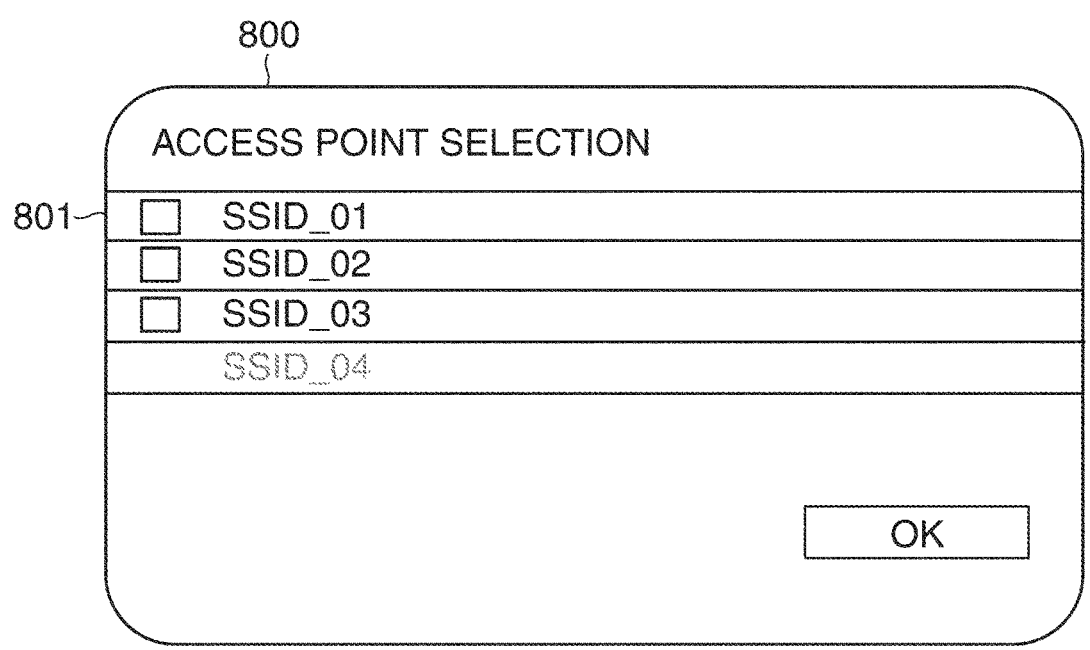
FIG. 8 is a view showing an example of an access-point selection screen displayed on the operation panel in FIG. 2.

As a result of the determination in the step S704, when the access point supports an authentication method that is available to the wireless LAN of the obtained role, the CPU 202 displays this access point in the access-point selection screen 800 in FIG. 8 in a selectable state (step S705). The access-point selection screen 800 is an operation screen displayed on the operation panel 211 to make a user select a desired access point from among a plurality of selection candidates. In the step S705, a check box 801 for selecting the above-mentioned access point is displayed on the access-point selection screen 800, for example.

In the next step S706, the CPU 202 determines whether there is an unconfirmed access point in the list information obtained in the step S702.

As a result of the determination in the step S706, when there is an unconfirmed access point, the CPU 202 returns the process to the step S704. In the meantime, as a result of the determination in the step S706, when there is no unconfirmed access point, the CPU 202 finishes this process.

As a result of the determination in the step S704, when the access point does not support the authentication method available to the wireless LAN of the obtained role, the CPU 202 displays this access point on the access-point selection screen 800 in the unselectable state (step S707). In the step S707, a check box for selecting the above-mentioned access point is not displayed on the access-point selection screen 800, for example. Then, the CPU 202 finishes this process.

In the process in FIG. 7 mentioned above, only an access point that supports the authentication method available to the role of the wireless LAN is displayed on the access-point selection screen 800 in the selectable state. Moreover, an access point that does not support the authentication method available to the role of the wireless LAN is displayed in the unselectable state. This makes a user select a suitable access point corresponding to the role of the wireless LAN from among the selection candidates in the access-point selection screen 800 certainly.

Next, a case where a user directly inputs an SSID etc. of an access point will be described.

Figure 9:
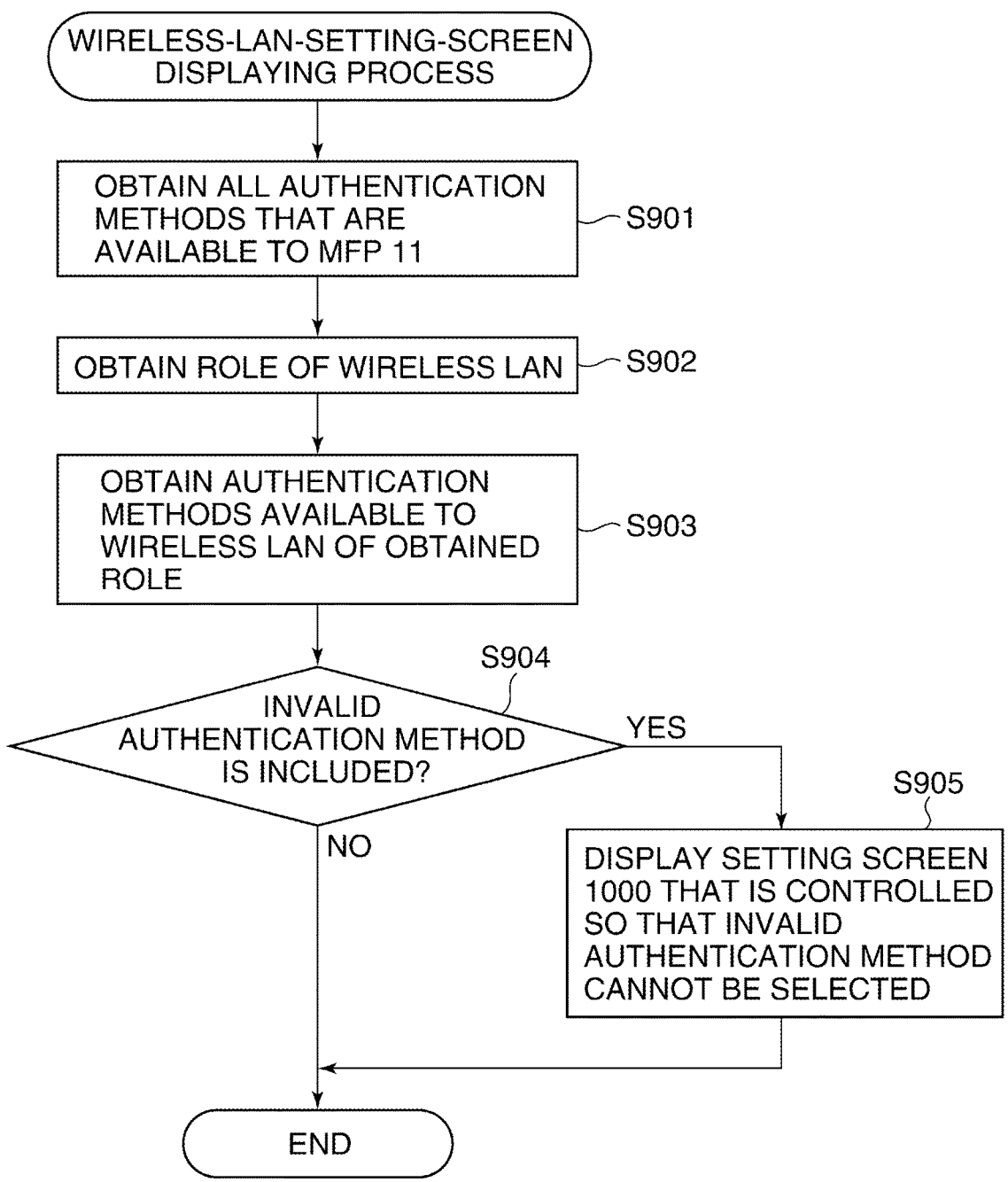
FIG. 9 is a flowchart showing procedures a wireless-LAN-setting-screen displaying process executed by the MFP in FIG. 1.

FIG. 9 is a flowchart showing procedures of a wireless-LAN-setting-screen displaying process executed by the MFP 11 in FIG. 1.

The process in FIG. 9 is also executed when the CPU 202 runs the program stored in the ROM 204. Moreover, the process in FIG. 9 is executed when a user who confirmed the message 601 designates the MFP 11 to display a setting screen 1000 in FIG. 10 mentioned below for inputting an SSID etc. of an access point directly.

In the embodiment, the user sets the authentication method that will be used through the setting screen 1000 in FIG. 10 mentioned below for inputting an SSID etc. of an access point directly. In the conventional MFP, even when an access point of either of the main line and sub line is set, all the authentication methods that are available to the MFP 11 are selectable in the setting screen 1000. Accordingly, the conventional MFP has a problem in that a user may select an authentication method unavailable to the sub line when the user directly sets an SSID of the access point of the sub line.

In light of this problem, the apparatus controls so that an authentication method unavailable to the role of the wireless LAN cannot be selected in the embodiment.

In the process in FIG. 9, the CPU 202 obtains all the authentication methods that are available to the MFP 11 (step S901). Next, the CPU 202 obtains the role of the wireless LAN (step S902) and obtains an authentication method that is available to the wireless LAN of the obtained role (step S903). Next, the CPU 202 determines whether the authentication methods obtained in the step S901 include an unavailable authentication method (i.e., an invalid authentication method) to the wireless LAN of the obtained role (step S904).

Figure 10:
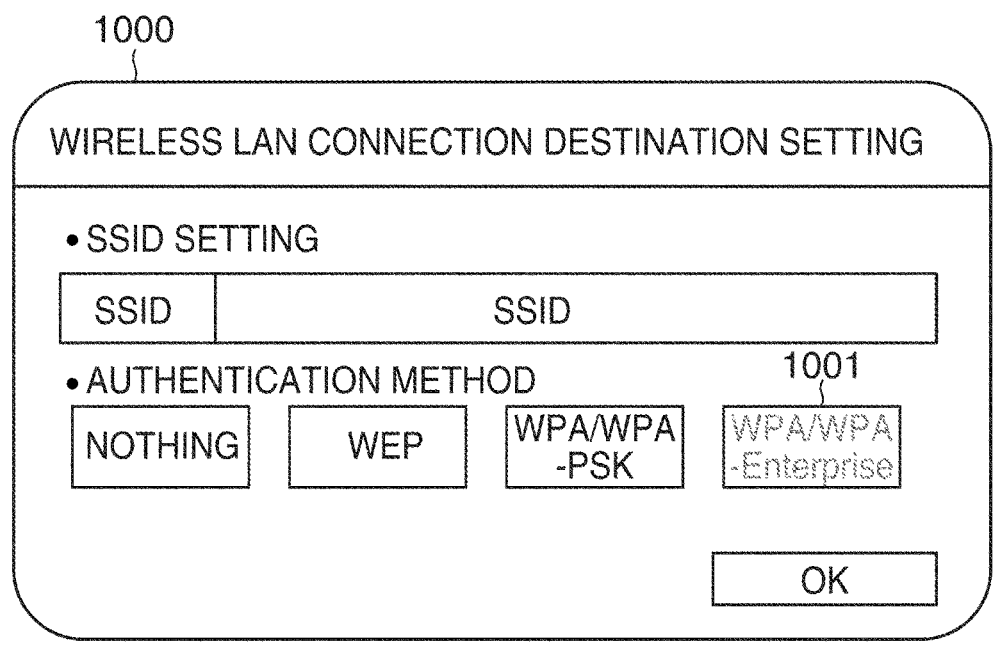
FIG. 10 is a view showing an example of a setting screen displayed on the operation panel in FIG. 2.

As a result of the determination in the step S904, when an invalid authentication method is included, the CPU 202 displays the setting screen 1000 shown in FIG. 10 that is controlled so that the invalid authentication method cannot be selected on the operation panel 211 (step S905). In the setting screen 1000, a setting button 1001 corresponding to "WPA/WPA2-Enterprise", which is an example of the invalid authentication method, is displayed in a grayout state so as to be unselectable. Then, the CPU 202 finishes this process.

As a result of the determination in the step S904, when an invalid authentication method is not included, the CPU 202 displays setting buttons corresponding to all the authentication methods that are available to the MFP 11 on the setting screen 1000 in the selectable state and finishes this process.

In the above-mentioned process in FIG. 9, the setting screen 1000 that is controlled so that an authentication method unavailable to the role of the wireless LAN cannot be selected is displayed. This prevents setting of an authentication method unavailable to the role of the wireless LAN in the setting screen 1000.

Although the present invention was described with the embodiment mentioned above, the present invention is not limited to the embodiment mentioned above. It is enough to control so that the above-mentioned access point cannot be selected in the step S707. For example, the above-mentioned access point may not be displayed on the access-point selection screen 800.

Moreover, it is enough to control so that an authentication method unavailable to the role of the wireless LAN cannot be selected in the step S905 in the above-mentioned embodiment. For example, a setting button corresponding to the above-mentioned authentication method may not be displayed on the setting screen 1000.

Furthermore, the connection destination information and the information about the role of the wireless LAN associated with the connection destination information may be registered to the connection history in the above-mentioned embodiment.

Figure 11:
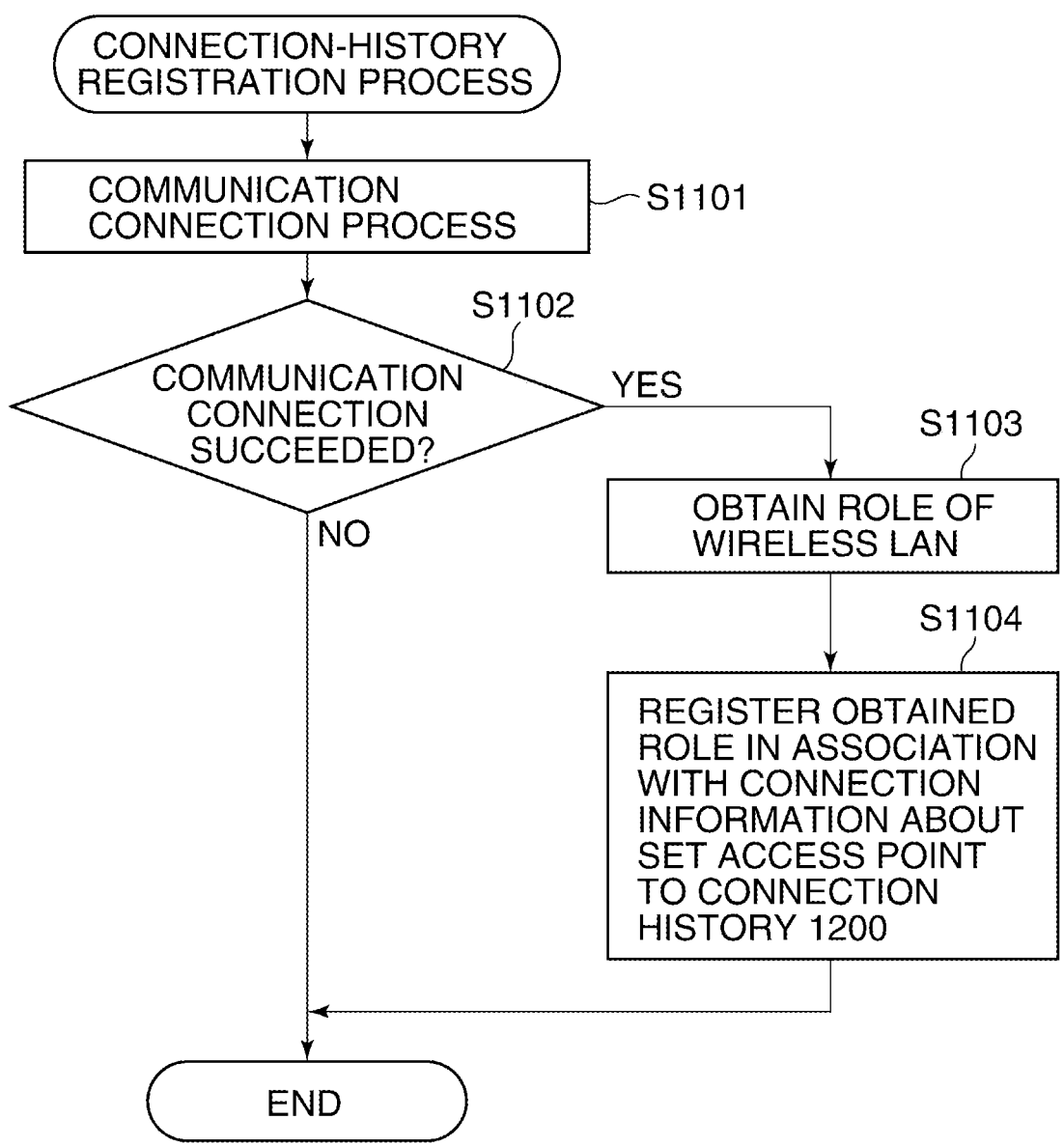
FIG. 11 is a flowchart showing procedures of a connection-history registration process executed by the MFP in FIG. 1.

FIG. 11 is a flowchart showing procedures of a connection-history registration process executed by the MFP 11 in FIG. 1.

The process in FIG. 11 is also executed when the CPU 202 runs the program stored in the ROM 204. Moreover, the process in FIG. 11 is executed when the MFP 11 succeeded in communication connection to an access point.

As shown in FIG. 11, the CPU 202 executes the communication connection process for connecting to the access point (hereinafter referred to as a "set access point") that was set (step S1101). Next, the CPU 202 determines whether the communication connection to the set access point succeeded (step S1102).

Figure 12:
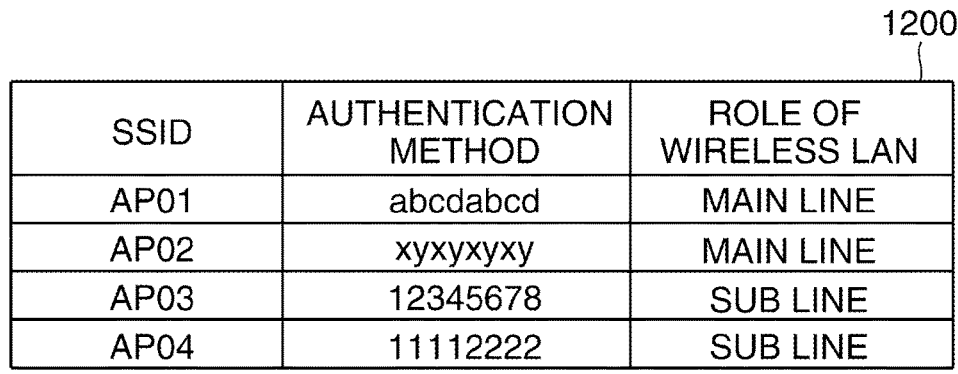
FIG. 12 is a view showing an example of a connection history managed by the MFP in FIG. 1.

As a result of the determination in the step S1102, when the communication connection to the set access point failed, the CPU 202 finishes this process. In the meantime, as a result of the determination in the step S1102, when the communication connection to the set access point succeeded, the CPU 202 obtains the role of the wireless LAN (step S1103). Next, the CPU 202 registers the obtained role and the connection destination information showing the set access point in association with each other into a connection history 1200 in FIG. 12 (step S1104). The connection history 1200 includes an SSID that shows an access point to which the MFP 11 succeeded in communication connection, an authentication method that the above-mentioned access point supports, and information about a role of the wireless LAN at the time of the communication connection to the above-mentioned access point. Next, the CPU 202 finishes this process.

Figure 13:
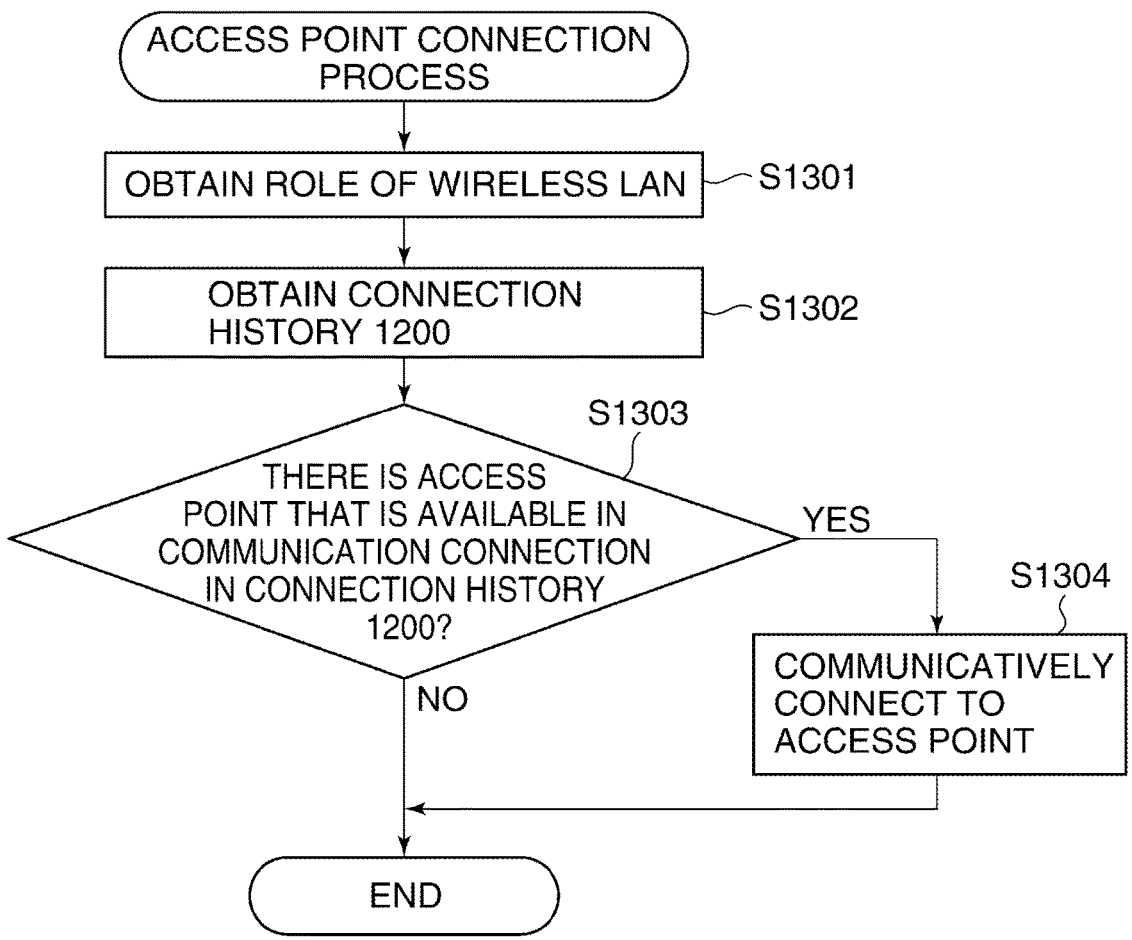
FIG. 13 is a flowchart showing procedures of a connection process executed by the MFP in FIG. 1.

FIG. 13 is a flowchart showing procedures of an access point connection process executed by the MFP 11 in FIG. 1.

The process in FIG. 13 is also executed when the CPU 202 runs the program stored in the ROM 204. Moreover, the process in FIG. 13 is executed when the MFP 11 is started and when the role of the wireless LAN is changed. The process in FIG. 13 premises that the connection destination information that shows the role of the wireless LAN and the access point corresponding to the role of the wireless LAN in association with each other has been already registered in the connection history 1200.

In the process in FIG. 13, the CPU 202 obtains the role of the wireless LAN set currently (step S1301). For example, when the process in FIG. 13 is started in response to the change of the role of the wireless LAN to the subline from the main line, the CPU 202 obtains the "subline" as the role of the wireless LAN. Next, the CPU 202 obtains the connection history 1200 (step S1302) and determines whether there is an access point that is available in communication connection in the obtained connection history 1200 (step S1303).

As a result of the determination in the step S1303, when there is an access point that is available in communication connection in the connection history 1200, the CPU 202 communicatively connects to this access point (step S1304). For example, when the role of the wireless LAN is the "sublime" and when the access point whose SSID is "AP04" in the connection history 1200 is located at a position that is communicatively connectable to the MFP 11, the CPU 202 communicatively connects to this access point. Then, the CPU 202 finishes this process.

As a result of the determination in the step S1303, when there is no access point that is available in communication connection in the connection history 1200, the CPU 202 notifies a user to prompt manual setting of an access point and finishes this process.

In the embodiment mentioned above, the MFP 11 communicatively connects to the access point associated with the role of the wireless LAN. Accordingly, the MFP 11 communicatively connects to the suitable access point corresponding to the role of the wireless LAN certainly.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-143588, filed Jul. 25, 2017, which is hereby incorporated by reference herein in its entirety.

What is claimed is:

1. An image forming apparatus communicating by a wireless LAN through an access point, the image forming apparatus comprising:
   a role setting unit configured to make a user set a role of the wireless LAN in the image forming apparatus; and
   a control unit configured to control a setting of the access point corresponding to the role of the wireless LAN,
   wherein the control unit makes the user reset the access point in a case where the role of the wireless LAN has been changed, and
   wherein the role of the wireless LAN shows whether the wireless LAN is used as a main line or a subline.

2. The image forming apparatus according to claim 1, wherein the control unit manages a history of connection to an access point that the image forming apparatus succeeded in communication connection and deletes the history of connection in a case where the role of the wireless LAN is changed.

3. The image forming apparatus according to claim 2, wherein connection destination information that shows an access point that the image forming apparatus succeeded in communication connection is associated with the role of the wireless LAN in the history of connection, and the image forming apparatus communicatively connects to the access point that the connection destination information associated with the role of the wireless LAN shows.

4. The image forming apparatus according to claim 1, wherein the control unit displays a message that prompts the user to reset the access point in a case where the role of the wireless LAN has been changed.

5. The image forming apparatus according to claim 1, wherein the control unit displays an access-point selection screen on which the user sets an access point, and
wherein only an access point that supports an authentication method available to the role of the wireless LAN is displayed on the access-point selection screen in a selectable state.

6. The image forming apparatus according to claim 5, wherein an access point that does not support an authentication method available to the role of the wireless LAN is displayed on the access-point selection screen in an unselectable state.

7. The image forming apparatus according to claim 5, wherein an access point that does not support an authentication method available to the role of the wireless LAN is not displayed on the access-point selection screen.

8. A control method for an image forming apparatus communicating by a wireless LAN through an access point, the control method comprising:
a role setting step of making a user set a role of the wireless LAN in the image forming apparatus; and
a control step of controlling a setting of the access point corresponding to the role of the wireless LAN,
wherein the user is prompted to reset the access point in the control step in a case where the role of the wireless LAN has been changed, and
wherein the role of the wireless LAN shows whether the wireless LAN is used as a main line or a subline.

9. A non-transitory computer-readable storage medium storing a control program causing a computer to execute a control method for an image forming apparatus communicating by a wireless LAN through an access point, the control method comprising:
a role setting step of making a user set a role of the wireless LAN in the image forming apparatus; and
a control step of controlling a setting of the access point corresponding to the role of the wireless LAN,
wherein the user is prompted to reset the access point in the control step in a case where the role of the wireless LAN has been changed, and
wherein the role of the wireless LAN shows whether the wireless LAN is used as a main line or a subline.

10. An image forming apparatus communicating by a wireless LAN through an access point, the image forming apparatus comprising:
a storage configured to store connection information of an access point to which the image forming apparatus has connected;
a wireless communicator configured to perform connecting function for connecting an access point based on the stored connection information and
at least one memory that stores a set of instructions; and
at least one processor that executes the instructions, the instructions, when executed, causing the image forming apparatus to perform operations comprising:
receiving an instruction for changing a role of the wireless communicator to one of a primary network interface and a secondary network interface, and
changing connection information of the access point stored in the storage, in a case where the instruction for changing the role of the wireless communicator is received,
wherein the stored connection information is changed so as to disable the wireless communicator to perform the connection function for connecting an access point, and
wherein the stored connection information before changing the role of the wireless communicator cannot be accessed, even if the role of the wireless communicator is rechanged to the same role of the wireless communicator before the stored connection information is changed so as to disable the wireless communicator to perform the connection function for connecting an access point.

11. The image forming apparatus according to claim 10, further comprising a display configured to display a message urging a user to set an access point to be connected using the wireless communicator in a case where the role of the wireless communicator is changed in accordance with the received instruction.

12. The image forming apparatus according to claim 10, further comprising a wired communicator,
wherein, in a case where the received instruction is an instruction for changing the role of the wireless communicator to the secondary network interface, the wired communicator is activated.

13. The image forming apparatus according to claim 10, wherein the secondary network interface is restricted in communication functions as compared with the primary network interface.

14. An image forming apparatus communicating by a wireless LAN through an access point, the image forming apparatus comprising:
a storage configured to store connection information including a Service Set Identifier (SSID) and an authentication information corresponding to the SSID of an access point to which the image forming apparatus has connected;
a wireless communicator configured to perform connecting function for connecting an access point using the stored connection information obtained from the storage;
at least one memory that stores a set of instructions; and
at least one processor that executes the instructions, the instructions, when executed, causing the image forming apparatus to perform operations comprising:
receiving an instruction for changing a communication mode for the wireless communicator to one of a first communication mode and a second communication mode,
deleting the stored connection information from the storage in a case where the instruction for changing the communication mode is received, and
terminating a connection to the access point in a case where the instruction for changing the communication mode is received, wherein the stored connection information before changing the communication mode cannot be accessed, even if the communication mode is rechanged to the same communication mode before the stored connection information is deleted.

15. The image forming apparatus according to claim 14, further comprising a display configured to display a message urging a user to set the an access point to be connected using the wireless communicator in a case where the communication mode for the wireless communicator is changed in accordance with the received instruction.

16. The image forming apparatus according to claim 14, further comprising a wired communicator,
   wherein, the first communication mode is a communication mode where the wireless communicator is used as a primary network interface, while the second communication mode is a communication mode where the wireless communicator is used as a secondary network interface,
   wherein in a case where the received instruction is an instruction for changing the communication mode for the wireless communicator to the second communication, the wired communicator is activated.

17. The image forming apparatus according to claim 14, wherein the second communication mode is restricted in communication functions as compared with the first communication mode.

* * * * *